United States Patent [19]

Bushman

[11] Patent Number: 4,627,339
[45] Date of Patent: Dec. 9, 1986

[54] APPARATUS FOR REMOVING SKINS AND PITS FROM AVOCADOS AND THE LIKE

[75] Inventor: Ronald C. Bushman, Hacienda Heights, Calif.

[73] Assignee: Brown International Corporation, Covina, Calif.

[21] Appl. No.: 682,832

[22] Filed: Dec. 18, 1984

[51] Int. Cl.⁴ .......................... A23N 4/00; A23N 7/00
[52] U.S. Cl. ....................................... 99/540; 99/547; 99/551; 99/552; 99/554; 99/587
[58] Field of Search ............... 426/478, 484, 485, 615, 426/438; 99/584, 587, 537, 540, 547, 554, 557, 562, 563, 534, 551–553

[56] References Cited

U.S. PATENT DOCUMENTS 1,785,011 12/1930 Felizianetti .
2,662,002 12/1952 Kingsbury .
3,099,303 7/1963 Anderson et al. .................... 99/584
4,158,993 6/1979 Spence ............................. 99/551 X
4,206,697 6/1980 Meissner .......................... 99/553 X Primary Examiner—Timothy F. Simone
Attorney, Agent, or Firm—Paul A. Weilein

[57] ABSTRACT

A method and apparatus are disclosed for removing skins and pits from avocados and the like in a process where the avocado is initially held in a split cup, knife means being operated for cutting through the avocado skin and flesh and for engaging and holding the avocado pit, jaw means being operated for engaging respective skin portions of the avocado, the jaw means then being retracted with the avocado skins, stripper means being movable relative to the knife means for urging the avocado flesh away from the avocado pit, the flesh portions of the avocados being collected in a first collection means, the pits and skins of the avocados being collected in a second collection means. Prior to processing in the manner described above, the avocados are preferably treated by immersion in hot avocado oil or the like in order to loosen their skins.

18 Claims, 14 Drawing Figures

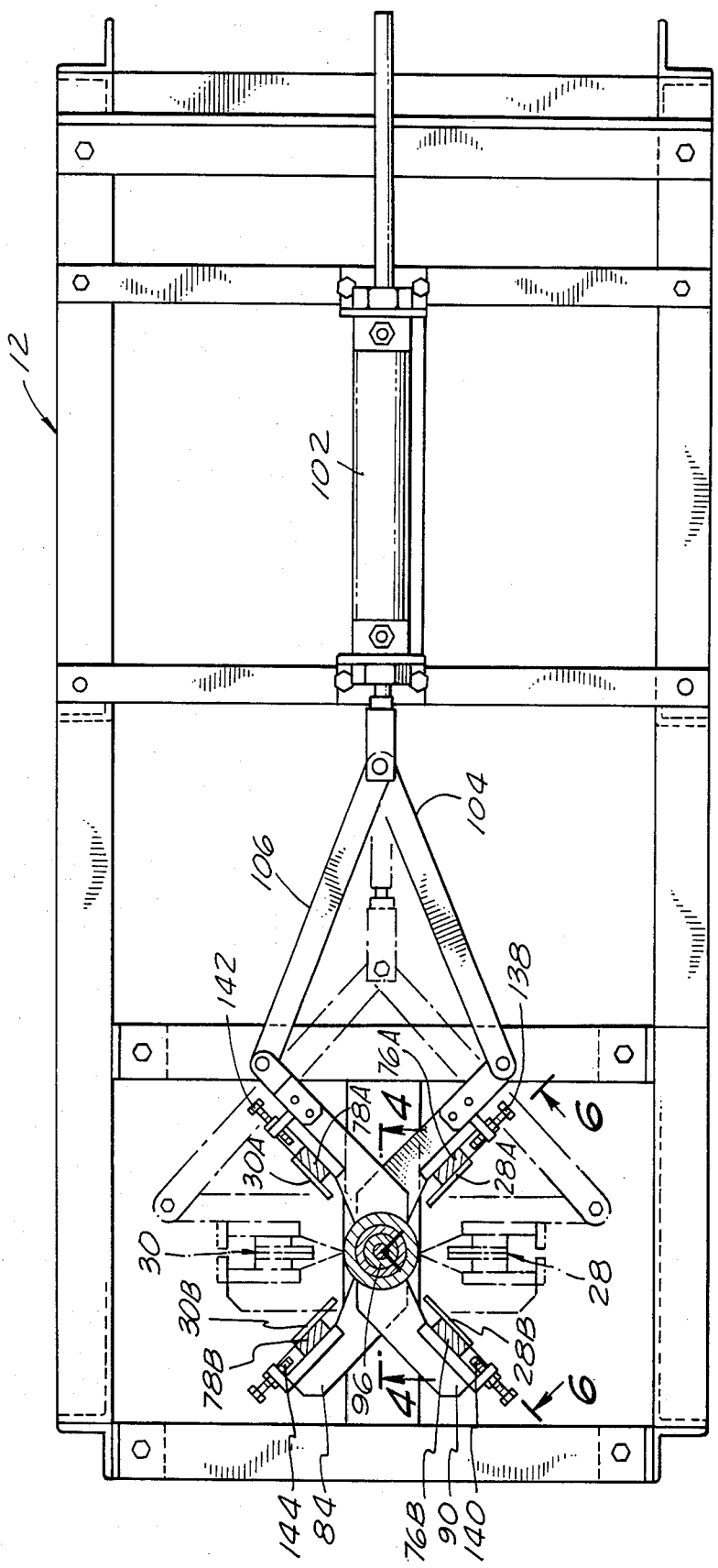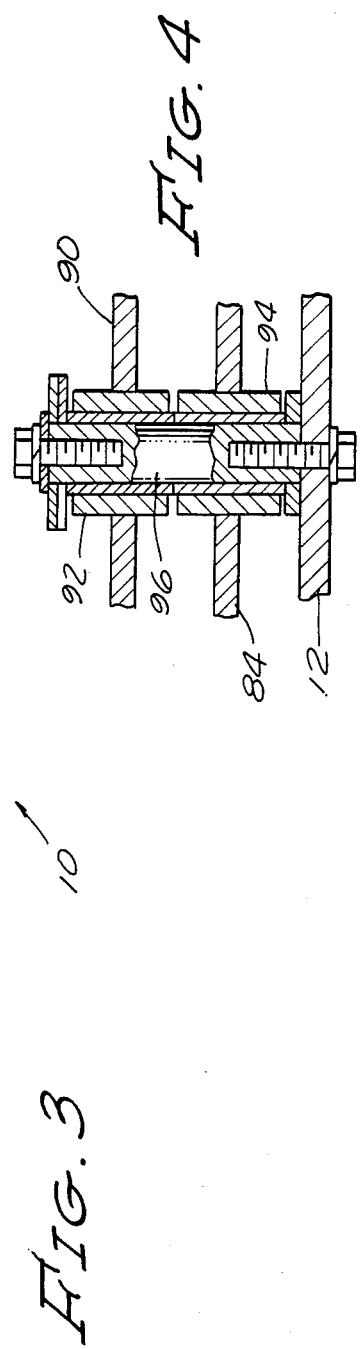

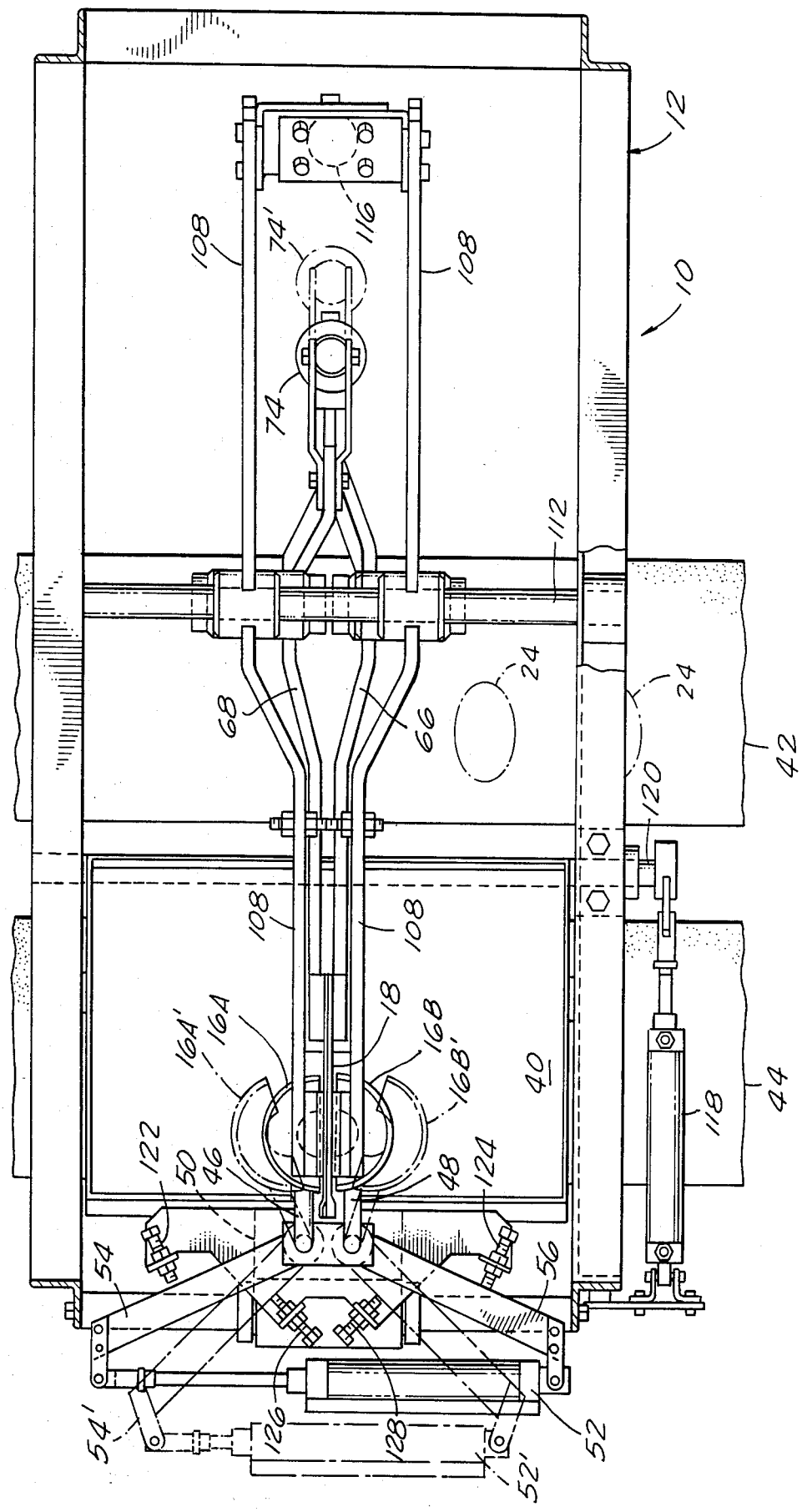

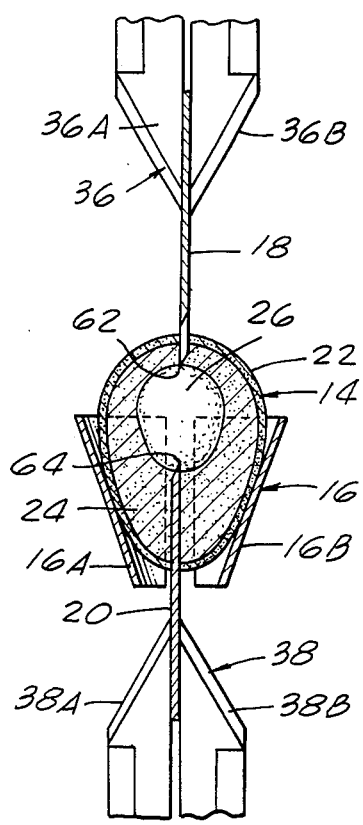
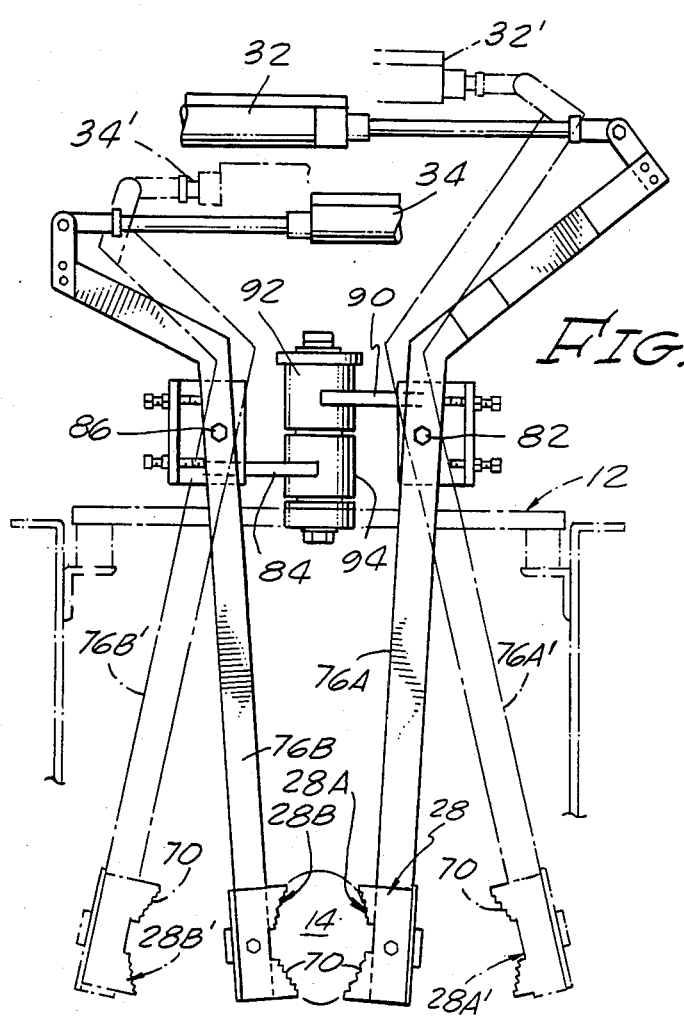
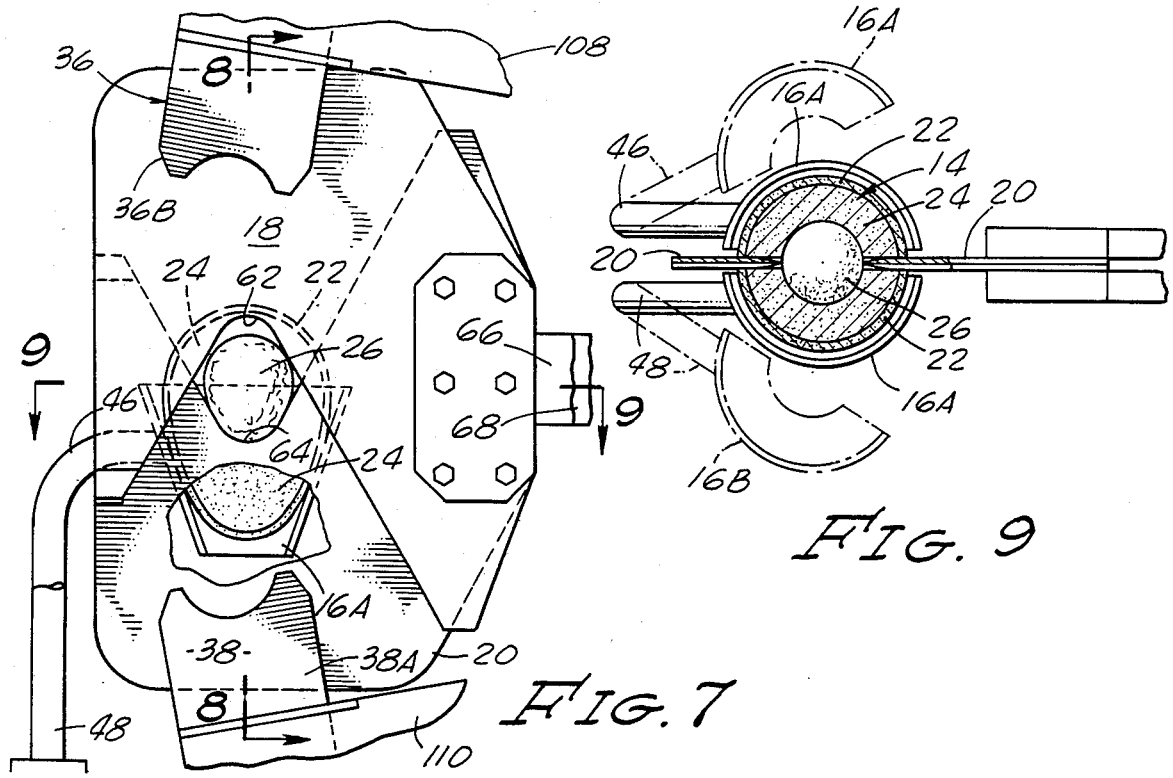

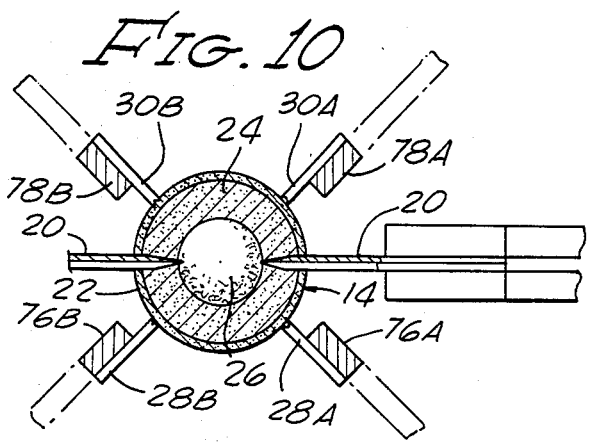
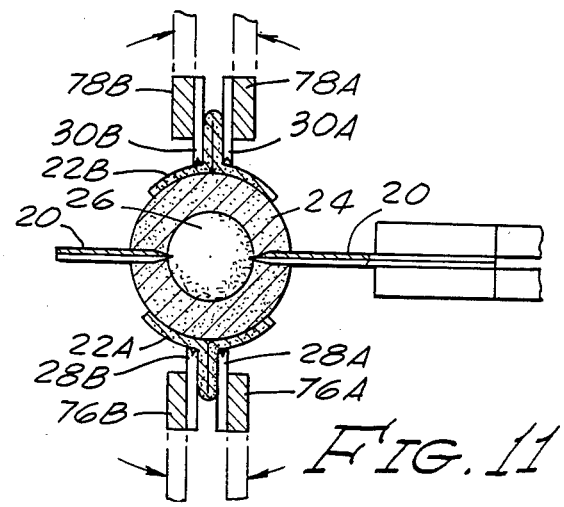
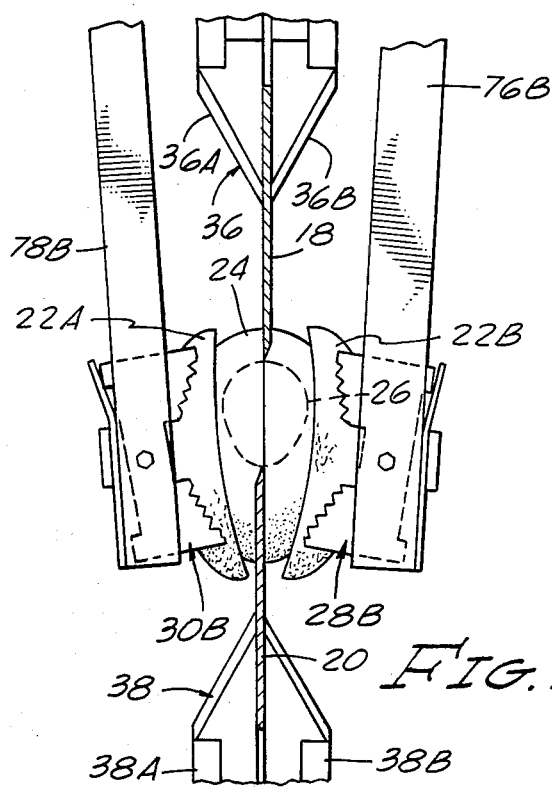
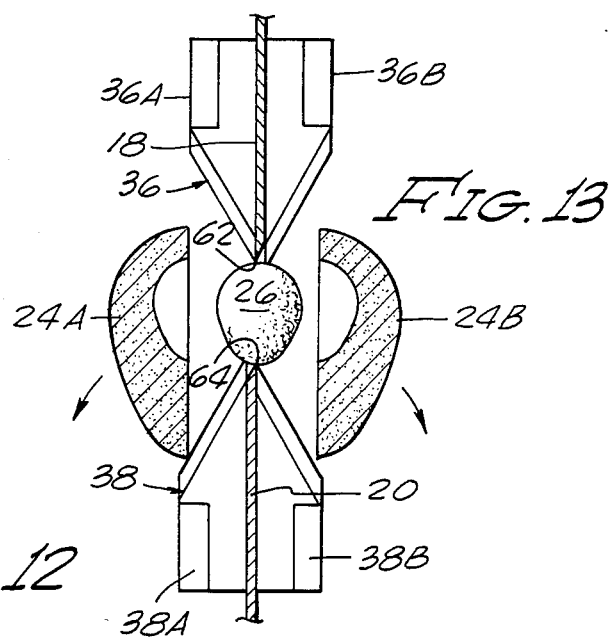
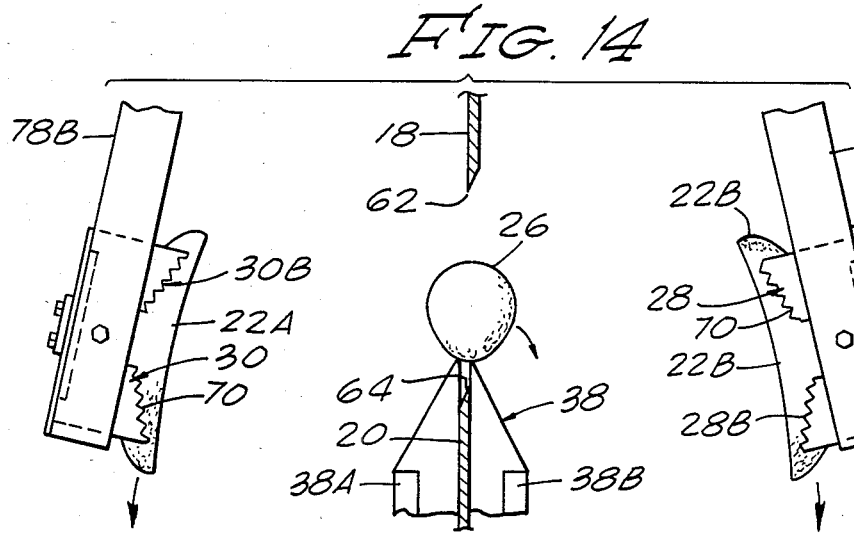

APPARATUS FOR REMOVING SKINS AND PITS FROM AVOCADOS AND THE LIKE

BACKGROUND OF THE INVENTION

The present invention relates to a method and apparatus for removing skins and pits from avocados and the like and more particularly to such a method and apparatus wherein the avocados are initially subjected to thermal treatment for loosening their skins.

Avocados are similar to other foods including fruits and vegetables such as tomatoes and peaches, at least to the extent that their skins are commonly removed before conversion to a processed food product. However, the processing of avocados to separate their usable flesh from the avocado skin and pit has not developed at the same pace as other foods. This has been due in part to the thermal sensitivity of the avocado flesh and its relatively limited shelf life, particularly in a ripened condition. At the same time, it has been found to be quite difficult to process ripened avocados because they are quite fragile.

In a copending U.S. patent application, Ser. No. 628,920, entitled METHOD FOR REMOVING SKINS FROM AVOCADOS, filed on July 9, 1984, now abandoned in favor of Continution-in-part application Ser. No. 778,845, filed Sept. 23, 1985, which issued as U.S. Pat. No. 4,600,593, dated 7/15/86, a method was disclosed for loosening the skins from avocados by thermal treatment. As disclosed therein, the avocados are preferably immersed in a hot triglyceride oil such as avocado oil or the like in order to loosen the skins from the avocado flesh without causing thermal degradation of the avocado flesh.

The method set forth by this reference to initially loosening the skins of avocados is contemplated for preferable use prior to the method and apparatus of the present invention. However, it is to be understood that the method and apparatus of the present invention could be employed with avocados or similar products for removing the skins and pits without the thermal treatment step of the reference. For example, if the avocados were sufficiently ripened so that their skins were relatively loose, the method and apparatus of the present invention could be employed without prior thermal treatment to loosen the skin.

In any event, because of the high nutritive value and unusual composition of the avocado fruit, it has special value as a food product. However, in view of its relatively fragile nature and short shelf life, for example, the avocado is most useful in a fresh or fresh frozen form. Because of the expense and difficulty in separating the avocado flesh from the skin and pit in the past, the level of use of avocados in various food products has heretofore been relatively limited. It is believed that market demand would be substantially greater if the avocado flesh were readily available for further processing or combination in food products.

In the past, the skins of avocados and like products have often been removed manually, not only resulting in an expensive and time-consuming operation, but also being characterized by the loss of part of the desirable green chlorophyll layer lying just beneath the avocado skin.

Mechanized techniques for separating the avocado flesh from the skin and pit have been developed in the past but only with accompanying limitations. For example, one such technique involved halving of the avocado fruit and removal of the pit, the resulting avocado halves being pressed between two surfaces to extrude the flesh through perforations in one of the surfaces. Although this process overcame the expense of manual operations, it necessarily resulted in the recovered avocado flesh being extruded or mashed. By contrast, it is desirable in certain food products that the avocado be present in various textures and it is therefore desirable to separate the avocado flesh in relatively integral portions.

In any event, there has been found to remain a need for an improved method and apparatus for the processing of avocados in order to effectively separate the avocado flesh from its skin and pit. In carrying out such a process, it is also necessary to allow for the relatively fragile nature and unique characteristics of avocados and the like.

SUMMARY OF THE INVENTION

It is therefore an object of the invention to provide a method and apparatus for removing skins and pits from avocados and the like in an efficient and effective manner.

It is a further object of the invention to provide such a method and apparatus wherein the avocados are initially subjected to thermal treatment for loosening their skins in order to facilitate subsequent removal of the skins.

Even more particularly, it is an object of the invention to provide such a method and apparatus wherein the avocados are initially immersed in a hot avocado oil or the like as disclosed in the copending reference referred to above.

It is another object of the invention to provide apparatus for removing skins and pits from avocados and the like, the apparatus including knife means for cutting through the skin and flesh of the avocado and for engaging and holding the avocado pit, jaw means for removing the avocado skin and stripper means for separating flesh portions of the avocado from the pit while the pit is engaged and held by the knife means.

It is a related object of the invention to provide a method for removing skins and pits from avocados and the like, the method including the steps of operating knife means for cutting through the skin and flesh of the avocado and for engaging and holding the avocado pit, removing the skin from the avocado and separating the flesh of the avocado from the pit while the pit is engaged and held by the knife means.

It is a further related object of the invention to provide such a method and apparatus wherein the knife means, the jaw means and the stripper means as well as the steps of the method employing those elements are carried out sequentially and in relatively automatic fashion to facilitate the removal of skins and pits from large numbers of avocados.

It is an even further object of the invention to provide such a method and apparatus further comprising first means for receiving and collecting the flesh portions of the avocados and second means for receiving and collecting the avocado pits and skins.

Additional objects and advantages of the invention are made apparent in the following description having reference to the accompanying drawings.

BRIEF DESCRIPTION OF THE DRAWINGS

Referring to the accompanying drawings, which are for illustrative purposes only:

FIG. 3 is a top view of the apparatus of the present invention taken along section line 3—3 of FIG. 2;

FIG. 4 is a fragmentary view, with parts in section, taken along section line 4—4 of FIG. 3 to illustrate a bearing assembly located at the top of the apparatus;

FIG. 5 is an intermediate view of the apparatus taken along section line 5—5 of FIG. 2 to illustrate components of the apparatus lying below the components illustrated in FIG. 3;

FIG. 6 is a fragmentary view taken along the staggered section line 6—6 of FIG. 3 in generally developed fashion to illustrate alternate positions for jaw means in the apparatus of the present invention;

FIG. 7 is an enlarged, fragmentary view taken from the left central portion of FIG. 2 to better illustrate a split cup and knife means of the apparatus;

FIG. 8 is also a fragmentary view with parts in section taken along section line 8—8 of FIG. 7 to better illustrate the manner in which the knife means cuts through the avocado skin and flesh for engaging and holding the avocado pit;

FIG. 9 is a fragmentary view, with parts in section and other parts shown in different operating positions, taken along section line 9—9 of FIG. 7 to better illustrate the manner in which the halves of the split cup are retracted after the avocado is engaged by the knife means to facilitate further processing;

FIG. 10 is a fragmentary plan view illustrating an avocado held in place by the knife means, its skin portions being engaged by respective pairs of jaw means;

FIG. 11 is a view similar to FIG. 10 with the respective pairs of jaw means moved toward each other for pinching the respective skin portions of the avocado therebetween;

FIG. 12 is a fragmentary side view of the combination of FIG. 11 taken along the plane of the knife means for better illustrating the arrangement and operation of the jaw means;

FIG. 13 is a similar fragmentary side view as in FIG. 12 illustrating operation of stripper means in combination with the knife means for separating flesh portions of the avocado from the avocado pit; and FIG. 14 is a fragmentary view of the jaw means and knife means illustrating simultaneous release of the avocado skins and the avocado pit prior to relocating all portions of the apparatus into initial operating positions for receiving a subsequent avocado.

DESCRIPTION OF THE PREFERRED EMBODIMENT

Figure 1:
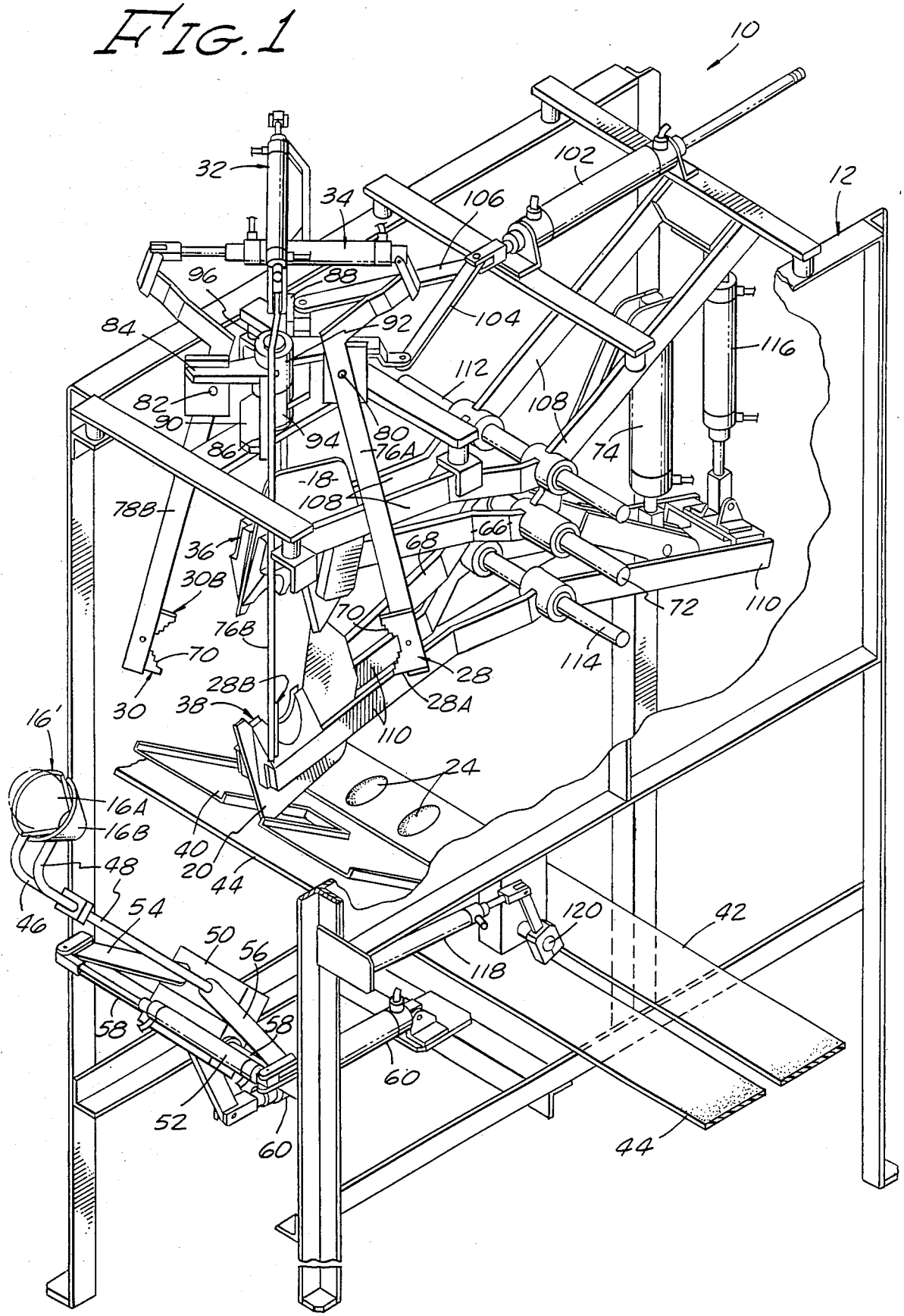
FIG. 1 is an isometric view, with parts shown in section and with other parts broken away, of apparatus constructed in accordance with the present invention for removing skins and pits from avocados.
Figure 2:
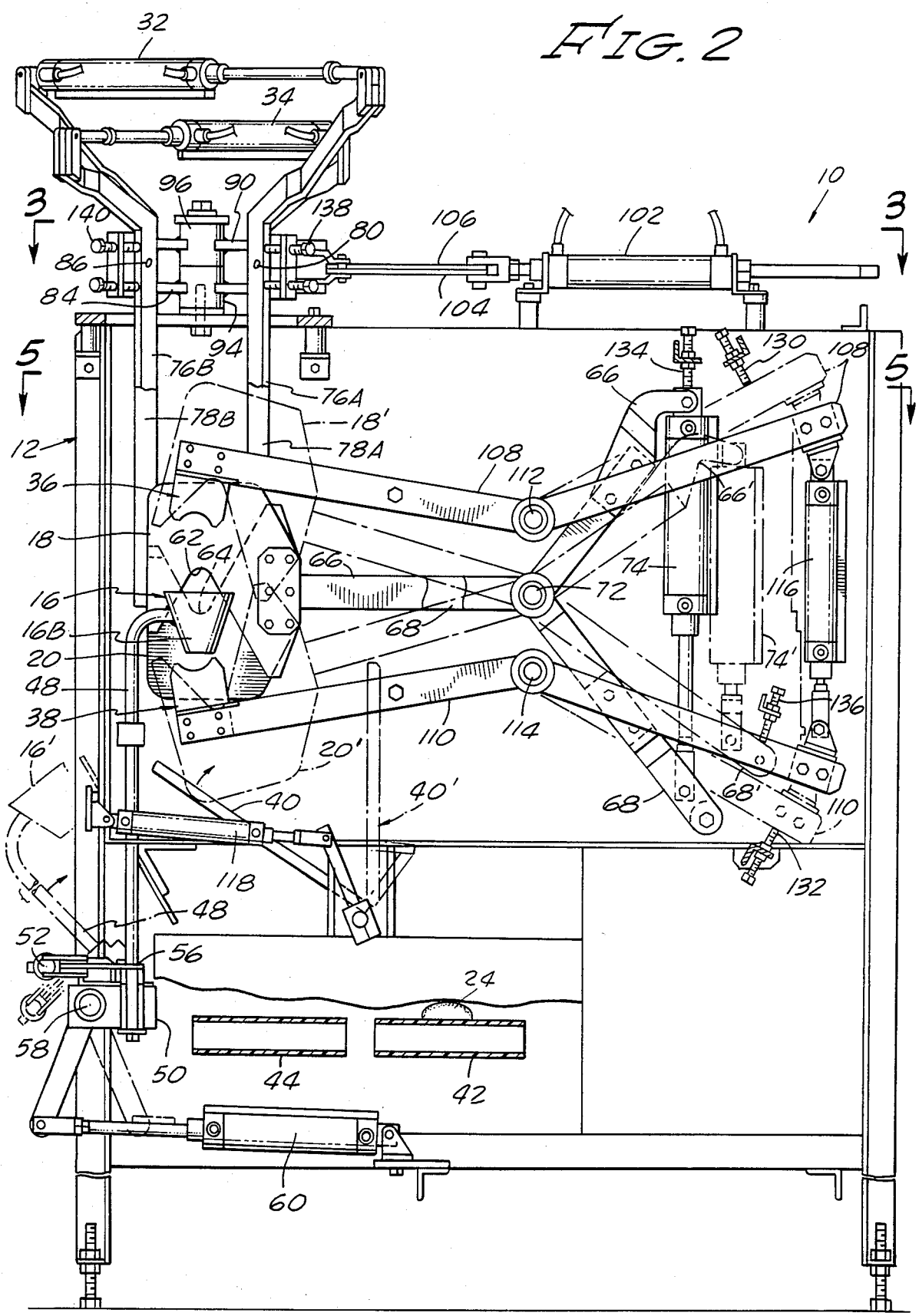
FIG. 2 is a side view of the apparatus illustrated in FIG. 1, taken in the direction of the arrows 2—2, selected parts being shown in section or broken away to better illustrate the invention, other portions of the apparatus being shown in multiple operating positions for the same purpose.

Referring to the drawings and particularly FIGS. 1 and 2, apparatus of the type contemplated by the present invention is generally indicated at 10, said apparatus being adapted for also performing the method of the present invention. The apparatus includes a framework 12 for supporting the various operating components of the apparatus. The major components of the apparatus and their functions within the method of the invention are briefly summarized below prior to a more detailed description of the apparatus and its method of operation.

Referring momentarily to FIG. 2, an avocado, as illustrated at 14 in FIGS. 6-10, is initially positioned by a split cup 16. With the avocado being held by the split cup 16, opposed knives 18 and 20 are urged toward each other in order to cut through the skin and flesh of the avocado and for engaging and holding the avocado pit. As shown in FIGS. 7-10, the avocado skin is indicated at 22, the flesh at 24 and the pit at 26.

After the avocado is engaged and held by the knives 18 and 20, the split cup 16 is opened and retracted to a position 16' illustrated in FIG. 1 to permit access to the avocado engaged and held by the knives 18 and 20.

After the split cup is retracted, opposed pairs of jaws 28 and 30 are brought into engagement with opposite skin portions of the avocado while the jaws are spaced apart from each other. With the avocado being sliced through by a pair of knives, two sets of jaw pairs as indicated at 28 and 30 are arranged for engagement with the two skin portions 22A and 22B on opposite sides of the knives or blades 18 and 20.

As will be described in greater detail below, the jaw pairs 28 and 30 are brought into engagement with the avocado skin by relatively low pressure cylinders 32 and 34 to ensure engagement of the jaw pairs 28 and 30 with the avocado skin while preventing damage to the relatively fragile flesh of the avocado.

After the jaw pairs 28 and 30 are in engagement with the avocado skin, the respective jaw pairs are rotated toward each other (see FIGS. 3, 10 and 11) in order to pinch the respective skin portions 22A and 22B therebetween. The closed jaw pairs 28 and 30 are then retracted away from the knives 18 and 20 to separate the avocado skin portions from the avocado flesh 24.

Wedge shaped strippers 36 and 38 are then moved toward each other along the plane of the respective knives 18 and 20 for forcing opposite portions 24A and 24B of the avocado flesh away from the avocado pit 26 as it remains held in place by the knives 18 and 20.

As illustrated in FIG. 1, the avocado flesh portions are received by an inclined deflector plate 40 and transferred to a conveyor belt 42 adapted for receiving and collecting the avocado flesh portions. After the avocado flesh portions are received by the conveyor belt 42, the deflector plate is pivoted upwardly to a position 40' illustrated in FIG. 2. Thereafter, the jaw pairs 28 and 30 are separated from each other and the knives 18 and 20 are retracted away from each other in order to respectively release the avocado skin portions 22 and pit 26 for collection upon a second conveyor belt 44.

Thereafter, with the avocado flesh portions being collected on the first conveyor belt 42 and the avocado skin portions and pit being collected on the second conveyor belt 44, the various components of the apparatus 10 are returned to their initial operating positions described above for receiving a subsequent avocado for processing in the same manner described above.

Before proceeding with a more detailed description of the apparatus 10, it is again noted that the invention preferably contemplates initial thermal treatment of the avocados in order to loosen their skins for facilitating processing by means of the method and apparatus of the present invention.

Preferably, the avocados are immersed in a triglyceride oil such as avocado oil or the like, maintained at a preferred temperature, the avocados remaining immersed for a selected time in order to facilitate loosening of their skins without permitting thermal degradation of the avocado flesh. Further details of such a treatment technique are set forth in the above noted reference which is accordingly incorporated herein as though set out in its entirety.

Referring to the apparatus 10 in greater detail, the split cup 16 is formed with half portions 16A and 16B which are initially positioned as illustrated, for example, in FIG. 5 for initially receiving the avocado 14. The split cup 16 is preferably arranged and formed for positioning the avocado 14 with the longitudinal axis of its pit in alignment with the opposed knives 18 and 20 (see FIG. 8). Preferably, the split cup 16 positions the avocado vertically, with its tapered end extending downwardly and its rounded end extending upwardly in the position illustrated in FIG. 8. The opposed knives 18 and 20 are also arranged for vertical movement, the upper knife 18 moving downwardly and the lower knife 20 moving upwardly for cutting through the avocado skin 22 and flesh 24 and engaging and holding the pit 26.

The cup portions 16A and 16B are mounted on rods 46 and 48 respectively which are both pivotably movable about their axes on a supporting bracket 50. Referring particularly to FIG. 1, a common double-acting cylinder 52 is interconnected with the rods 46 and 48 by means of links 54 and 56. Thus, operation of the cylinder 52 is capable of rotating the rods 46 and 48 for moving the cup portions 16A and 16B toward each other to closed position (FIG. 5) and away from each other to open position illustrated at 16A' and 16B' in FIG. 5. Referring momentarily to FIG. 2, the bracket 50 is also rotatable about a transverse pin 58 by another cylinder 60 in order to move the split cup between the solid line position illustrated at 16 and the retracted position illustrated at 16' (see FIG. 2).

The knives 18 and 20 are respectively formed with concave cutting edges 62 and 64 in order to facilitate their functions of cutting through the avocado skin and flesh and for engaging and holding the pit. The concave shape of the cutting edges 62 and 64 and the manner in which they serve to better engage the avocado pit 26 may be best seen in FIG. 7.

The knives 18 and 20 are respectively supported on arms 66 and 68, the arms 66 and 68 being adapted for pivotable movement about a common pivot pin 72 by means of a common double-acting cylinder 74. The cylinder 74 is interconnected between the ends of the arms 66 and 68 opposite the knives 18 and 20 with the cylinder extended into the position illustrated in solid lines in FIG. 2. The arms 66 and 68 and the knives 18 and 20 then assume the positions illustrated for those components in solid lines. As the cylinder 74 is retracted into a position illustrated in phantom at 74', the arms 66, 68 and knives 18, 20 are shifted into positions illustrated respectively at 66', 68' and 18', 20'. As will be apparent from the following description, the cylinder 74 is maintained in its extended position until after the avocado is in place within the cup 16. The cylinder 74 is then retracted to the position illustrated in phantom for causing the knives 18 and 20 to cut through the avocado skin and flesh and to engage and hold the avocado pit 26 (see FIGS. 7 and 8, for example).

The jaw pairs 28 and 30 each include separate jaws 28A, 28B and 30A, 30B which are respectively pivotally supported on downwardly extending arms 76A, 76B, 78A and 78B. Each of the jaws is formed with a concave, serrated surface 70. The concave shape of the surfaces 70 conforms better to the surface of the avocado while the serrations on the surface 70 facilitate pinching engagement of the avocado skin in a manner described in greater detail below.

Referring particularly to FIGS. 1–4, the arms 76A, 76B and 78A, 78B are mounted for moving the respective jaws radially outwardly and inwardly while at the same time being adapted for rotation of the respective jaw pairs toward and away from each other in order to respectively engage and release the avocado skin portions as hereinafter described in greater detail.

As may be best seen in FIG. 1, jaws 28A and 30B and their supporting arms 76A and 78A are arranged radially opposite each other with respect to the axis of the avocado position. Similarly, the jaws 28B and 30A together with their supporting arms 76B and 78A are also arranged in radially opposing fashion with respect to the axis of the avocado position.

In order to facilitate radial movement of the jaws 28A and 30B inwardly toward the avocado and outwardly, the arms 76A and 78B are pivotably connected at 80 and 82 to an offset lever element 84. Similarly, the arms 76B and 78A are pivotably interconnected at 86 and 88 to another offset lever element 90. The lever elements 84 and 90 include respective bushings 92 and 94 which are mounted on a common shaft 96 (see FIG. 4). The axis of the shaft 96 is generally in line with the axis of the avocado 14 when it is positioned within the cup 16 and held between the knives 18 and 20.

Radial movement of the respective jaws is controlled by the two double-acting cylinders 32 and 34 interconnected respectively between the opposed arms 76B, 78A and 76A, 78B above the offset lever elements 84 and 90. As the cylinders 32 and 34 are retracted, the jaws 28A, 28B and 30A, 30B move radially outwardly away from each other and away from the avocado 14. Conversely, as the cylinders 32 and 34 are extended, the jaw pairs are moved inwardly toward each other and toward the avocado for engagement with its skin as partially illustrated in FIG. 6, for example.

The cylinders 32 and 34 are preferably pneumatic cylinders adapted for developing a relatively low pressure of about 3 to 5 pounds for engagement of the respective jaws with the avocado. In this manner and because of the floating mount of the cylinders 32 and 34, the respective jaws are each adapted for positively entering into engagement with the skin of the avocado while avoiding damage to the avocado flesh by application of excessive pressure.

In order to accomplish angular movement or rotation of the respective jaws, the offset lever elements 84 and 90 are interconnected with a common cylinder 102 by links 104 and 106 as best seen in FIG. 3. With the cylinder 102 extended, the links 104, 106 and the lever elements 84 and 90 are caused to assume the positions illustrated in phantom in FIG. 3 with the respective jaw pairs 28A, 28B and 30A, 30B angularly moved into pinching engagement with each other, as may be best seen in FIGS. 3 and 11. As the cylinder 102 is retracted toward the position illustrated in solid lines in FIG. 3, the links 104, 106 act on the lever elements 84, 90 and cause the respective jaw pairs to rotate or move angularly away from each other and toward the positions illustrated in FIGS. 1, 2 and 6 and schematically shown in FIG. 10.

The strippers 36 and 38 are each formed with opposed portions 36A, 36B and 38A, 38B arranged on opposite sides of the knives 18 and 20. The strippers are wedge shaped and are preferably formed from a plastic material such as polyfluoroethylene (available from the Dupont Company under the trademark TEFLON) in order to avoid contamination of the avocado flesh and at the same time to facilitate separation of the avocado flesh portions from the strippers 36 and 38 after they are removed from the avocado pit in the manner hereinafter described in greater detail.

Other portions of the apparatus 10, particularly those portions which contact the avocado such as the knives 18 and 20, are preferably formed from a suitable material such as stainless steel.

The opposed stripper elements 36A, 36B and 38A, 38B are mounted on bifurcated arms 108 and 110. The bifurcated arms 108 and 110 are in turn arranged for pivotable movement about respective rods 112 and 114, the opposite ends of the bifurcated arms 108 and 110 being interconnected by a common double-acting cylinder 116. Referring particularly to FIG. 2, for example, with the cylinder 116 being retracted, the arms 108, 110 are caused to assume the solid line positions illustrated in FIG. 2 with the strippers 36, 38 being moved apart from each other for initially receiving an avocado. As the cylinder 116 is extended, the arms 108, 110 are moved toward the positions illustrated in phantom with the strippers 36, 38 being caused to move toward each other and relative to the knives 18 and 20 in order to cause the avocado flesh 24 to be separated from the avocado pit 26 in a manner schematically illustrated in FIG. 13.

The deflector plate 40 (see FIG. 2) is positioned by another cylinder 118. With the cylinder 118 retracted as illustrated in FIG. 2, the deflector plate 40 is pivoted upon a rod 120 into the position illustrated in solid lines, where it is positioned for receiving avocado flesh portions separated from the avocado pit by the strippers 36, 38 and deflecting them onto the first conveyor belt 42. With the cylinder 118 extended, the deflector plate is moved toward the position illustrated in phantom at 40'. With the deflector in the erect position illustrated at 40', the apparatus is adapted for release of the avocado skin portions and avocado pit so that they may drop directly onto the second conveyor belt 44.

With many of the cylinders in the apparatus 10 being free-floating, adjustable stops are provided either for positioning the cylinders and the components they operate or to prevent overtravel of the cylinders and their respective components.

The adjustable stops 122 and 124 act on links 54 and 56 to limit action of cup cylinder 52 in extension and adjustable stops 126 and 128 similarly act on the links at 54' and 56' to limit retraction of cylinder 52.

The adjustable stops 130 and 132 act on arms 108 and 110 to limit extension of cylinder 116 and position the strippers 36 and 38 as they are moved toward each other.

An adjustable stop 134 acts on arm 66 to position cylinder 74 (and knives 18 and 20) upon extension of cylinder 74 and movement of knives 18 and 20 toward each other for engaging an avocado. Stop 136 acts on arm 68 to position cylinder 74 in a retracted condition.

The adjustable stops 138, 140, 142 and 144 act on and prevent overtravel of jaw arms 74A, 76B, 78A and 78B respectively. However, it is to be kept in mind, as noted above, that the low pressure cylinders 32 and 34 are free-floating to assure that the jaws 28A, 28B and 30A, 30B enter into positive engagement with the avocado skin while avoiding injury to its relatively delicate flesh.

Thus, there has been described above particularly novel and effective apparatus for facilitating the removal of the skin and pit from flesh portions of an avocado. The manner of operation contemplated for the apparatus is believed apparent from the preceding description. However, that method of operation is described briefly below in order to assure a complete understanding of the invention.

Initially, the cylinder 52 is extended and the cylinder 60 is retracted as illustrated in FIGS. 1 and 2 so that the split cup is positioned at 16' to receive an avocado 14.

The cylinder 74 is retracted as illustrated in phantom in FIG. 2 so that the knives 18 and 20 are separated from each other. Similarly, the cylinder 116 is retracted so that the strippers 36 and 38 are also moved apart from each other.

At the same time, the cylinders 32, 34 are retracted so that the jaw pairs 28, 30 are moved radially outwardly from each other. The cylinder 102 is also extended into the solid line position illustrated in FIG. 3 so that the jaw pairs 28A, 28B and 30A, 30B are angularly positioned apart from each other as is schematically represented in FIG. 10.

The cylinder 118 is retracted so that the deflector plate is in the solid line, inclined position 40 best seen in FIG. 2.

With the various components in the positions described above, an avocado is positioned in the split cup at 16'. The cylinder 60 is then extended to move the split cup and avocado to the cup position at 16. The avocado is then located in a central portion of the apparatus 10 generally in alignment with the axis of the shaft 96 (see FIGS. 3 and 4). The cylinder 74 is then extended causing the knives 18 and 20 to move toward each other, cutting through the avocado skin and flesh and engaging and holding the avocado pit 26, that position of the knives being best illustrated in FIGS. 7 and 8.

After the knives are engaged with the avocado pit 26, the cylinder 52 is retracted in order to position the split cup portions in the positions illustrated at 16A' and 16B' (see FIG. 5) so that they may be moved past the avocado 14 held between the blades 18 and 20. The cylinder 60 is then retracted in order to swing the cup assembly toward the position illustrated generally at 16' in FIG. 2, thereby permitting engagement of the jaw pairs 28 and 30 with the periphery of the avocado.

In order to actuate the jaw pairs 28 and 30, the cylinders 32 and 34 are initially extended in order to axially move the jaws into engagement with the periphery of the avocado. As noted above, the relatively low pressure pneumatic operation of the cylinders 32 and 34 facilitates proper engagement of the jaws with the avocado. After the jaws are axially engaged with the avocado, the cylinder 102 is then extended causing the offset lever elements 84 and 90 (see FIG. 3) to rotate the respective jaw pairs 28A, 28B and 30A, 30B toward each other in order to pinch and hold the opposite skin portions 22A and 22B therebetween. This function of the jaws may be best seen in FIG. 11.

After the avocado skin portions 22A and 22B are securely held between the respective jaw pairs 28 and 30, the cylinders 32 and 34 are again retracted in order to move the jaws 28 and 30 and skin portions 22A and 22B radially outwardly from the avocado flesh. This relative position of the jaws may be best seen in FIG. 14.

After the avocado skin portions 22A and 22B are moved away from the avocado flesh, the cylinder 116 is extended in order to cause the strippers 36 and 38 to move toward each other and along the knives 18 and 20 for stripping the opposite flesh portions 24A and 24B from the avocado pit as is schematically illustrated in FIG. 13.

With the deflector plate in the solid line position 40 illustrated in FIGS. 1 and 2, the avocado flesh portions 24A and 24B are allowed to move downwardly along the deflector plate 40 to be received by the first conveyor 42.

After operation of the strippers 36, 38 causing the avocado flesh to fall onto the first conveyor belt 42, the cylinder 118 is extended, causing the deflector plate to assume its erect position illustrated in phantom at 40' in FIG. 2. Thereafter, the jaw cylinder 102 and knife cylinder 74 are extended at substantially the same time so that the avocado skin portions 22A, 22B and the avocado pit 26 are released at substantially the same time and allowed to drop directly onto the second conveyor belt 44. As may be best seen for example in FIG. 14, the knife edges tend to be retracted beyond a projecting edge of the respective stripper in order to assure release of the pit 26.

After the avocado skin portions and pit are allowed to drop onto the second conveyor 44, all of the components in the apparatus 10 are returned to their initial operating positions described above for receiving a subsequent avocado, whereupon the steps described above are repeated for separating the flesh from the skin and pit of the subsequent avocado.

Preferably, the various cylinders included in the apparatus 10 are interconnected by conventional sequencing means (not shown) adapted for operation in generally conventional fashion to cause operation of the various components of the apparatus 10 in the manner described above.

Accordingly, there has been described a method and apparatus for facilitating the removal of skins and pits from avocado flesh. Various modifications in addition to those described or referred to above are believed obvious from the preceding description. The scope of the present invention is thus defined only by the appended claims.

What is claimed is:

1. Apparatus for removing skins and pits from avocados and the like, comprising:
   knife means for cutting through the skin and flesh of an avocado and for engaging and holding the avocado pit,
   jaw means for engaging the avocado skin on opposite sides of the knife means and removing it from the avocado flesh, and
   stripper means for separating flesh portions of the avocado from the pit while the pit is engaged and held by said knife means.

2. The apparatus of claim 1 further comprising first collection means for receiving the flesh portions of the avocado after they are separated from the pit by said stripper means, and second collection means for receiving the avocado skin and pit after they are released respectively by said jaw means and said knife means.

3. The apparatus of claim 1 wherein the avocado pit has a longitudinal axis and said knife means is formed with a cutting plane along which it engages the avocado pit and further comprising cup means for initially holding the avocado in a position with the longitudinal axis of the pit being generally aligned with the plane of said knife means.

4. The apparatus of claim 3 wherein said cutting plane of said knife means is vertically arranged, said cup means being formed for holding the avocado with the longitudinal axis of its pit being vertically aligned.

5. The apparatus of claim 3 wherein said cup means is split for allowing said knife means to cut through the avocado skin and flesh for engaging the pit.

6. The apparatus of claim 5 further comprising means for separating said split cup means after the avocado pit is engaged and held by said knife means in order to facilitate subsequent engagement of said jaw means with the avocado skin.

7. The apparatus of claim 6 wherein said knife means comprises opposed knife blades having concave cutting edges for cutting through the avocado skin and flesh and for engaging and holding the avocado pit.

8. The apparatus of claim 1 wherein said jaw means comprises separate pairs of jaws for engaging separate skin portions of the avocado.

9. The apparatus of claim 7 further comprising operating means for urging each pair of jaws into contact with a respective skin portion and then urging the pair of jaws toward each other for securing the skin portion therebetween.

10. The apparatus of claim 8 wherein two pairs of jaws are provided for engagement with respective skin portions on opposite sides of said knife means.

11. The apparatus of claim 8 wherein said jaw operating means are adapted for initially urging said pairs of jaws toward the respective skin portions under relatively low pressure in order to ensure engagement of said jaws with the skin portions and then closing each pair of jaws for pinching and securing the respective skin portions therebetween.

12. The apparatus of claim 11 wherein said jaw operating means are further adapted for retracting said pairs of jaws away from the avocado flesh after said pairs of jaws are closed into engagement with the respective avocado skin portions.

13. The apparatus of claim 1 wherein said stripper means comprise opposed portions adjacent said knife means, said opposed stripper portions being mounted relative to said knife means for separating the avocado flesh from the avocado pit while the avocado pit is held by said knife means.

14. The apparatus of claim 13 wherein said knife means comprises opposed knives with facing cutting edges for cutting through the avocado skin and flesh and for engaging and holding the avocado pit, said opposed stripper portions being movable from separating the avocado flesh from the avocado pit while the avocado pit is engaged and held by said knife means.

15. The apparatus of claim 5 wherein said jaw means comprise separate pairs of jaws for engaging separate skin portions of the avocado and said stripper means comprise opposed stripper portions adjacent said knife means, means for initially shifting said knife means toward the avocado in order to cut through the avocado skin and flesh and for securing and holding the avocado pit, means for thereafter separating said split cup means from the avocado, means for operating said jaw means to engage respective skin portions of the avocado and then retracting said jaw means away from the avocado, means for operating said stripper means in order to separate opposite flesh portions of the avocado from the avocado pit, and means for causing said jaw means to release the avocado skin portions and for causing said knife means to separate in order to release the avocado pit, and means for causing said cup means, knife means, jaw means and stripper means to assume initial operating positions for receiving another whole avocado.

16. The apparatus of claim 1 further comprising first collection means for receiving the flesh portions of the avocado after they are separated from the pit by said stripper means, and second collection means for receiving the skin portions and pit after they are released respectively by said jaw means and said knife means, the skin portions and pit of the avocado being released simultaneously by said respective operating means for reception by said second collection means.

17. The apparatus of claim 16 being adapted for receiving avocados having their skins initially loosened by immersion in hot triglyceride oil or the like.

18. The apparatus of claim 1 being adapted for receiving avocados having their skins initially loosened by immersion in hot triglyceride oil or the like.

* * * * *